(12) United States Patent
Ha et al.

(10) Patent No.: US 12,427,805 B2
(45) Date of Patent: Sep. 30, 2025

(54) WHEEL STRUCTURE, METHOD OF CONTROLLING WHEEL STRUCTURE, AND MOBILITY INCLUDING WHEEL STRUCTURE

(71) Applicants: Hyundai Motor Company, Seoul (KR); Kia Corporation, Seoul (KR)

(72) Inventors: Ji Woo Ha, Suwon-si (KR); Tae Yu Kim, Suwon-si (KR); Hun Keon Ko, Anyang-si (KR); Jea Kyoo An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 505 days.

(21) Appl. No.: 17/988,447

(22) Filed: Nov. 16, 2022

(65) Prior Publication Data
US 2023/0406036 A1    Dec. 21, 2023

(30) Foreign Application Priority Data
Jun. 15, 2022 (KR) .......................... 1020220073080

(51) Int. Cl.
*B60B 9/28* (2006.01)
*B60B 9/18* (2006.01)
*F16D 67/02* (2006.01)

(52) U.S. Cl.
CPC .................. *B60B 9/28* (2013.01); *B60B 9/18* (2013.01); *B60B 2900/551* (2013.01); *F16D 67/02* (2013.01)

(58) Field of Classification Search
CPC .. B60B 9/18; B60B 9/28; B60B 15/16; B60B 15/22; B60B 19/04; B60B 2900/551;
(Continued)

(56) References Cited

U.S. PATENT DOCUMENTS

| 1,489,173 A | * | 4/1924 | Taylor | ..................... B60B 15/16 301/46 |
| 7,503,567 B2 | | 3/2009 | Frankie | |

(Continued)

FOREIGN PATENT DOCUMENTS

| CN | 105946449 A | * | 9/2016 | ............. B60B 19/00 |
| CN | 114754228 A | * | 7/2022 | ............. F16L 55/32 |

(Continued)

*Primary Examiner* — Kip T Kotter
(74) *Attorney, Agent, or Firm* — Fish & Richardson P.C.

(57) ABSTRACT

A wheel structure includes a variable spoke configured to connect a wheel and a central shaft and having a length that varies in a radial direction of the wheel, a spoke driving unit configured to provide power for changing the length of the variable spoke in the radial direction, and a power transmission unit configured to transmit power from the spoke driving unit to the variable spoke. A plurality of variable spokes are spaced apart from one another in the circumferential direction. The power transmission unit includes an output shaft configured to rotate by receiving power from the spoke driving unit, and a clutch configured to connect the variable spoke and the output shaft and selectively transmit a rotational force of the output shaft to the variable spoke or cut off the transmission of the rotational force to the variable spoke.

19 Claims, 11 Drawing Sheets

(58) Field of Classification Search
CPC ........ A61G 5/06; A61G 5/061; B62D 57/024;
F16D 67/02; F16D 21/06
See application file for complete search history.

(56) References Cited

U.S. PATENT DOCUMENTS

| | | | |
|---|---|---|---|
| 7,806,208 B2 | 10/2010 | Gunderson et al. | |
| 9,878,576 B2 * | 1/2018 | Hein | ........................ B60B 19/04 |
| 2017/0349003 A1 * | 12/2017 | Joso | ........................ B60G 13/04 |
| 2018/0022148 A1 * | 1/2018 | Lin | ........................ B60B 1/006 |
| | | | 152/5 |

FOREIGN PATENT DOCUMENTS

| | | | | |
|---|---|---|---|---|
| FR | 2795947 A1 * | 1/2001 | ............... | B60B 9/00 |
| JP | 2010143344 A | 7/2010 | | |
| KR | 2012053236 A * | 5/2012 | | |
| KR | 20130037808 A | 4/2013 | | |
| KR | 20150075574 A | 7/2015 | | |
| KR | 20150102886 A | 9/2015 | | |
| KR | 20170083854 A | 7/2017 | | |
| KR | 20180126576 A | 11/2018 | | |
| KR | 20190103852 A | 9/2019 | | |
| KR | 102107597 B1 | 5/2020 | | |
| KR | 102154615 B1 | 9/2020 | | |
| KR | 20210096506 A | 8/2021 | | |

* cited by examiner

WHEEL STRUCTURE, METHOD OF CONTROLLING WHEEL STRUCTURE, AND MOBILITY INCLUDING WHEEL STRUCTURE

CROSS-REFERENCE TO RELATED APPLICATION

This application claims priority to and the benefit of Korean Patent Application No. 10-2022-0073080 filed in the Korean Intellectual Property Office on Jun. 15, 2022, the entire contents of which are incorporated herein by reference.

TECHNICAL FIELD

The present disclosure relates to a wheel structure, a method of controlling the wheel structure, and a mobility including the wheel structure, and more particularly, to a wheel structure having a structure, which may be deformed actively in shape in accordance with a state of a ground surface on which the wheel structure moves, a method of controlling the wheel structure, and a mobility including the wheel structure.

BACKGROUND ART

In the case of a low-speed mobility such as a wheelchair, it is necessary to ensure traveling performance even in a case in which the mobility travels on ground surfaces having various shapes. Studies on wheels mounted on the mobilities are being actively conducted to ensure the traveling performance.

For example, the mobility needs to be equipped with a wheel having a structure capable of minimizing impact that is applied to the wheel from the ground surface and applied to an occupant when the ground surface on which the mobility travels is not uniform.

In the related art, spokes of the wheel are configured such that a length of each of the spokes varies depending on a state of the ground surface to ensure the performance. However, in the related art, because the lengths of the spokes are independently changed, the responsiveness of the spokes to the state of the ground surface deteriorates, and components for independently controlling the lengths of the spokes are required. For this reason, there is a problem in that a structure of the wheel is complicated.

SUMMARY

The present disclosure has been made in an effort to provide a new type of wheel structure capable of independently controlling lengths of spokes by using a simple structure while changing the lengths of the spokes in accordance with a state of a ground surface on which the wheel structure moves.

A first aspect of the present disclosure provides a wheel structure including: a wheel including a portion provided in an outer region and extending in a circumferential direction C; a wheel driving unit configured to provide power for rotating the wheel about a central shaft A; a variable spoke configured to connect the wheel and the central shaft A and having a length that varies in a radial direction R of the wheel; a spoke driving unit configured to provide power for changing the length of the variable spoke in the radial direction R; and a power transmission unit configured to transmit power from the spoke driving unit to the variable spoke, in which the variable spoke is provided in plural, and the plurality of variable spokes is spaced apart from one another in the circumferential direction C, and in which the power transmission unit includes: an output shaft configured to rotate by receiving power from the spoke driving unit; and a clutch configured to dynamically connect the variable spoke and the output shaft and selectively transmit a rotational force of the output shaft to the variable spoke or cut off the transmission of the rotational force to the variable spoke.

The output shaft may be provided in plural, the clutch may be provided in plural, and the plurality of clutches may respectively connect the variable spokes and the output shafts.

The variable spoke may include: a first spoke region having one side fixed relative to the clutch; and a second spoke region coupled to the first spoke region and configured to be movable outward in the radial direction R by receiving a rotational force from the output shaft.

The output shaft may include: a shaft body extending in the radial direction R and having one side connected to the clutch; and a shaft gear fixedly coupled to the shaft body and having a serrated region formed on an outer portion thereof.

The power transmission unit may further include a ring gear having a serrated region that engages with the serrated region formed on the shaft gear.

The power transmission unit may further include an input shaft connected to the spoke driving unit and configured to be rotatable by receiving power from the spoke driving unit, and the ring gear may be fixedly coupled to an outer periphery of the input shaft.

The wheel may include: a plurality of leg regions respectively fixedly coupled to outer ends of the plurality of variable spokes based on the radial direction R; and a plurality of support regions each provided between the two leg regions adjacent to each other in the circumferential direction C, and two opposite ends of the leg region based on the circumferential direction C may be in contact with the support regions adjacent to the leg region.

The wheel may further include a connection region extending outward in the radial direction R from the central shaft A and configured to connect the central shaft and the support region.

The wheel may include a plurality of leg regions respectively fixedly coupled to outer ends of the plurality of variable spokes based on the radial direction R, and two opposite ends of any one of the leg regions based on the circumferential direction C may be in contact with other leg regions.

The wheel structure may further include: a restoring member configured to apply a force to the variable spoke in a direction in which the length of the variable spoke in the radial direction R decreases when the length of the variable spoke in the radial direction R increases.

The restoring member may be a gas spring.

The restoring member may be provided in parallel with the variable spoke and spaced apart from the variable spoke in a width direction W of the wheel structure.

The restoring member may be a band member having elasticity.

The power transmission unit may further include: a clutch-brake unit including the clutch and a brake configured to brake a motion of the variable spoke in a direction in which the length of the variable spoke decreases; a front end pulley member configured to connect the output shaft and the clutch-brake unit and transmit a rotational force of the output shaft to the clutch-brake unit; and a rear end pulley member configured to connect the variable spoke and the clutch-brake unit and transmit a rotational force of the clutch-brake unit to the variable spoke.

The power transmission unit may further include: a double clutch-brake unit including the clutch and a brake configured to brake a motion of the variable spoke in a direction in which the length of the variable spoke decreases; a first gear member fixedly coupled to the output shaft and having a serrated region formed on an outer surface thereof; a second gear member having a serrated region formed on an outer surface thereof and configured such that the serrated region engages with the serrated region of the first gear member; a connection shaft fixedly coupled to the second gear member; a first rear end pulley member configured to connect the double clutch-brake unit and the variable spoke and transmit a rotational force of the double clutch-brake unit to the variable spoke; and a second rear end pulley member configured to connect the connection shaft and the double clutch-brake unit and transmit a rotational force of the connection shaft to the double clutch-brake unit, and the clutch may include: a first clutch configured to connect the output shaft and the first rear end pulley member and selectively transmit a rotational force of the output shaft to the first rear end pulley member or cut off the transmission of the rotational force to the first rear end pulley member; and a second clutch configured to connect the second rear end pulley member and the first rear end pulley member and selectively transmit a rotational force of the second rear end pulley member to the first rear end pulley member or cut off the transmission of the rotational force to the first rear end pulley member.

The power transmission unit may further include: a brake configured to brake a motion of the variable spoke in a direction in which the length of the variable spoke decreases; a first gear member fixedly coupled to the output shaft, provided between the brake and the output shaft, and having a serrated region formed on an outer surface thereof; a second gear member having a serrated region formed on an outer surface thereof and configured such that the serrated region engages with the serrated region of the first gear member; a front end pulley member connected to the first gear member and configured to receive a rotational force of the first gear member; and rear end pulley members configured to connect the clutches and the variable spoke, the clutches may include: a first clutch connected to the front end pulley member; and a second clutch connected to the second gear member, and the rear end pulley members may include: a first rear end pulley member configured to connect the first clutch and the variable spoke; and a second rear end pulley member configured to connect the second clutch and the variable spoke.

A second aspect of the present disclosure provides a method of controlling a length of the variable spoke of the wheel structure during a process in which the wheel structure moves on a ground surface, the method including: a front length increasing step of increasing the length of the variable spoke provided in a front region of the wheel structure based on a traveling direction of the wheel structure; and a rear length decreasing step of decreasing the length of the variable spoke in a rear region of the wheel structure in a state in which the variable spoke has the length increased in the front length increasing step, the rear length decreasing step being performed after the front length increasing step.

The method may further include a length maintaining step of maintaining the length of the variable spoke in a state in which the variable spoke has the length increased in the front length increasing step, the length maintaining step being performed between the front length increasing step and the rear length decreasing step.

The method may further include: a front length decreasing step of decreasing the length of the variable spoke in the front region of the wheel structure in a state in which the variable spoke has the length increased in the front length increasing step, the front length decreasing step being performed after the front length increasing step; and a rear length increasing step of increasing the length of the variable spoke in the rear region of the wheel structure in a state in which the variable spoke has the length decreased in the front length decreasing step, the rear length increasing step being performed after the front length decreasing step.

A third aspect of the present disclosure provides a mobility including: a wheel structure; and a frame to which the wheel structure is coupled, in which the wheel structure includes: a wheel including a portion provided in an outer region and extending in a circumferential direction C; a wheel driving unit configured to provide power for rotating the wheel about a central shaft A; a variable spoke configured to connect the wheel and the central shaft A and having a length that varies in a radial direction R of the wheel; a spoke driving unit configured to provide power for changing the length of the variable spoke in the radial direction R; and a power transmission unit configured to transmit power from the spoke driving unit to the variable spoke, in which the variable spoke is provided in plural, and the plurality of variable spokes is spaced apart from one another in the circumferential direction C, and in which the power transmission unit includes: an output shaft configured to rotate by receiving power from the spoke driving unit; and a clutch configured to connect the variable spoke and the output shaft and selectively transmit a rotational force of the output shaft to each of the plurality of variable spokes or cut off the transmission of the rotational force to each of the plurality of variable spokes.

According to the present disclosure, it is possible to provide a new type of wheel structure capable of independently controlling the lengths of the spokes by using the simple structure while changing the lengths of the spokes in accordance with a state of the ground surface on which the wheel structure moves.

DETAILED DESCRIPTION

Figure 1:
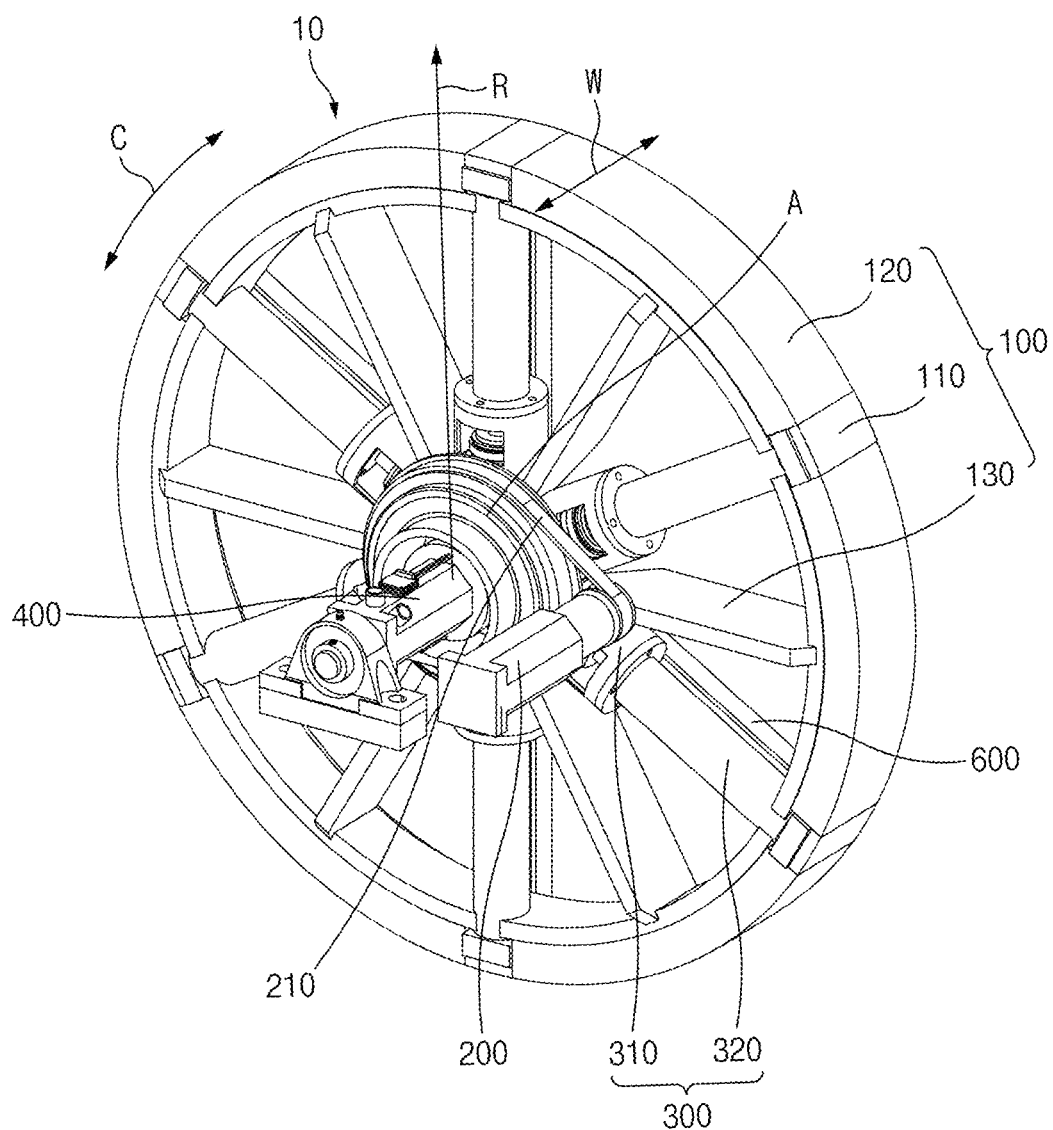
FIG. 1 is a view illustrating a wheel structure according to an embodiment of the present disclosure when viewed in a first direction.
Figure 2:
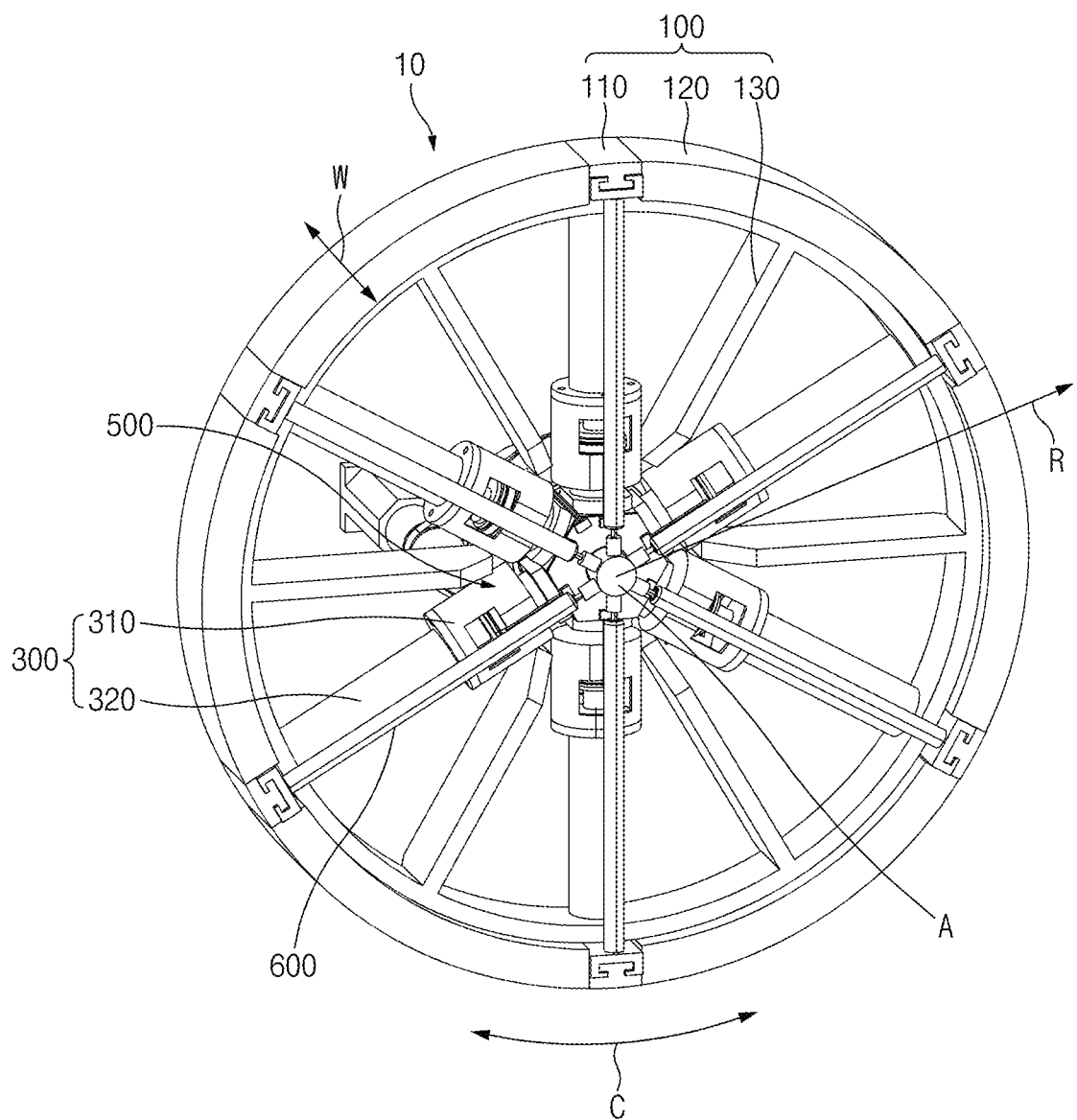
FIG. 2 is a view illustrating the wheel structure according to the embodiment of the present disclosure when viewed in a second direction.
Figure 3:
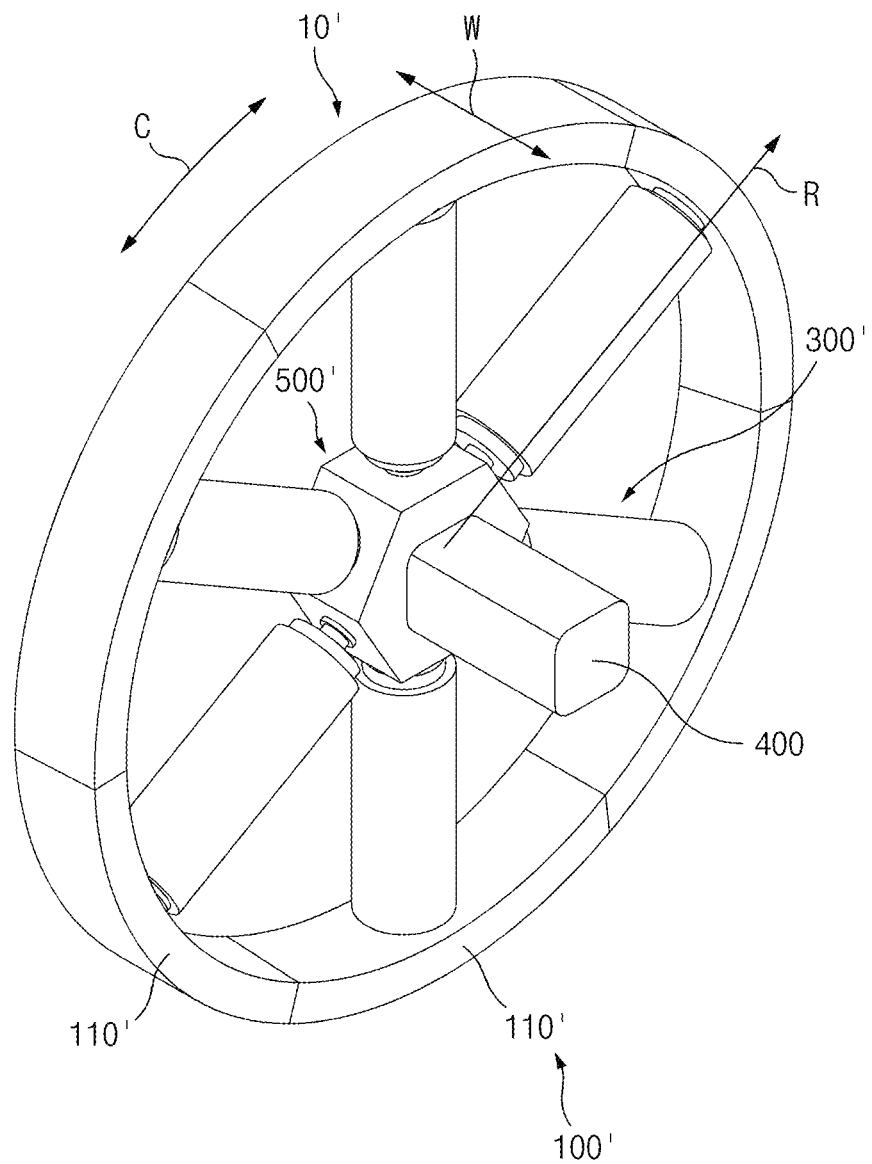
FIG. 3 is a view illustrating a wheel structure according to another embodiment of the present disclosure when viewed in the first direction.
Figure 4:
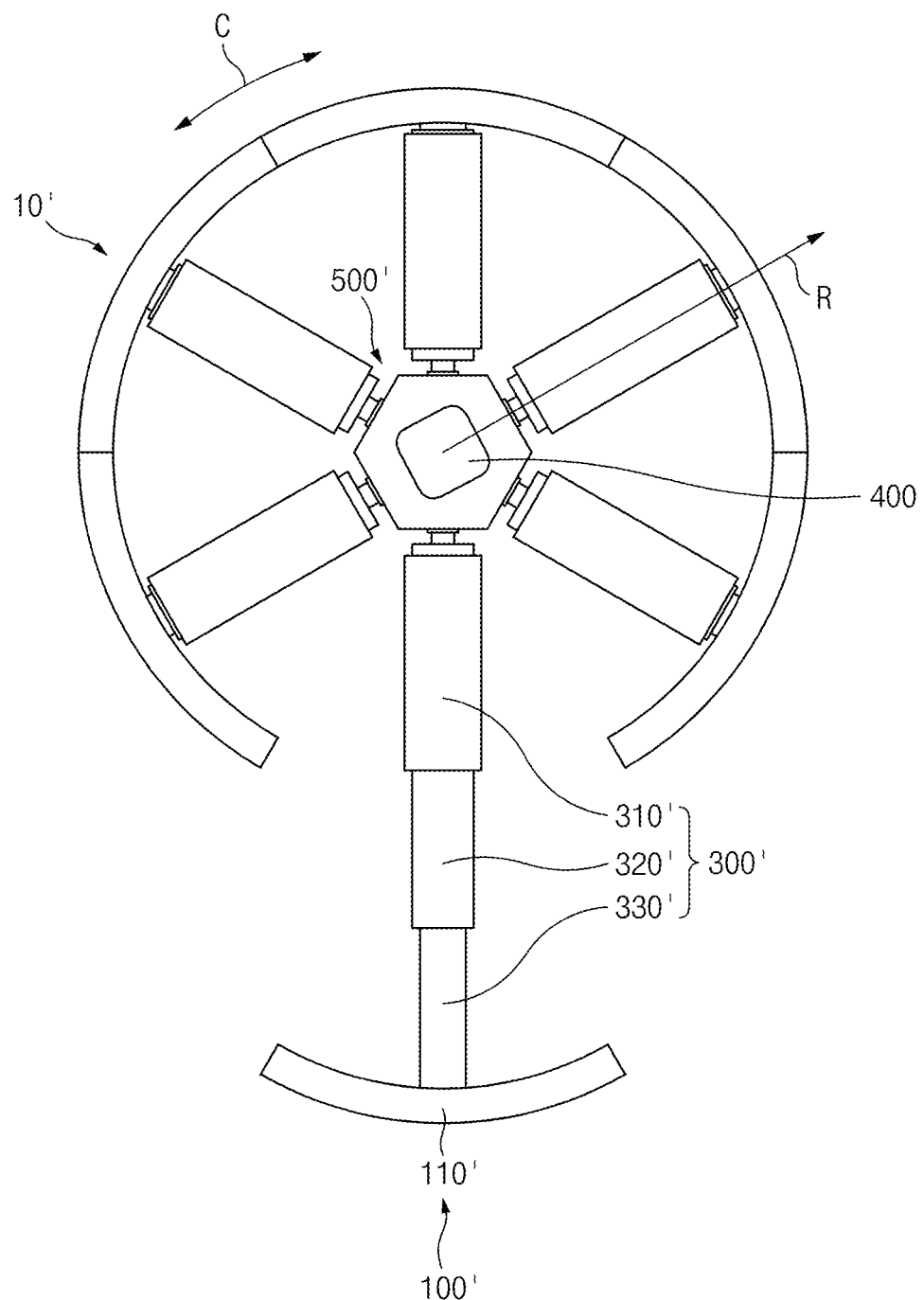
FIG. 4 is a view illustrating the wheel structure according to another embodiment of the present disclosure when viewed in the second direction.

Hereinafter, a wheel structure, a method of controlling the wheel structure, and a mobility according to the present disclosure will be described with reference to the drawings. Wheel Structure and Method of Controlling Wheel Structure FIG. 1 is a view illustrating a wheel structure according to an embodiment of the present disclosure when viewed in a first direction, and FIG. 2 is a view illustrating the wheel structure according to the embodiment of the present disclosure when viewed in a second direction. FIG. 3 is a view illustrating a wheel structure according to another embodiment of the present disclosure when viewed in the first direction, and FIG. 4 is a view illustrating the wheel structure according to another embodiment of the present disclosure when viewed in the second direction.

Referring to FIGS. 1 to 4, a wheel structure 10 and 10' according to the present disclosure may include a wheel 100 and 100' including a portion provided in an outer region of the wheel structure 10 and 10' based on a radial direction R and extending in a circumferential direction C of the wheel structure 10 and 10'. The portion of the wheel 100 and 100', which extends in the circumferential direction C, may be a portion that supports the wheel structure 10 and 10' when the wheel structure 10 and 10' moves on a ground surface.

In addition, the wheel structure 10 and 10' may further include a wheel driving unit 200 configured to provide power for rotating the wheel 100 and 100'. More specifically, the wheel driving unit 200 may provide power for rotating the wheel 100 and 100' about a central shaft A. Therefore, the wheel driving unit 200 may be configured to provide power required to move the wheel structure 10 and 10' on the ground surface. For example, the wheel driving unit 200 may be an electric motor, but the type of wheel driving unit 200 is not limited to the electric motor. FIG. 1 illustrates an example in which the wheel driving unit 200 is provided at an eccentric position from the central shaft A of the wheel 100, and a pulley member 210 is provided to transmit power from the wheel driving unit 200 to the central shaft A.

The wheel structure 10 and 10' may further include variable spokes 300 and 300' configured to connect the wheel 100 and 100' and the central shaft A and each having a length that may change in the radial direction R of the wheel 100 and 100'. The variable spoke 300 and 300' may support at least a part of an outer region of the wheel 100 and 100' and move at least a part of the outer region of the wheel 100 and 100′ in the radial direction R of the wheel structure 10 and 10'. Therefore, as described below, the variable spokes 300 and 300' may allow the wheel structure 10 and 10' to move on the ground surfaces having various shapes and smoothly move upward or downward in a region with stepped portions such as stairs.

More specifically, as illustrated in FIGS. 1 to 4, the variable spoke 300 and 300' may be provided in plural, and the plurality of variable spokes 300 and 300' may be spaced apart from one another in the circumferential direction C of the wheel structure 10 and 10'. For example, FIGS. 1 to 4 illustrate that six variable spokes 300 and 300' are disposed at equal intervals in the circumferential direction C. However, the number of variable spokes 300 and 300' is not limited to the feature illustrated in the drawings.

Referring to FIGS. 1 to 4, the wheel structure 10 and 10' may further include a spoke driving unit 400 configured to provide power for changing the lengths of the variable spokes 300 and 300' in the radial direction R. Therefore, the spoke driving unit 400 may move at least a part of the outer region of the wheel 100 and 100' in the radial direction R. For example, the spoke driving unit 400 may be a linear actuator.

Figure 5:
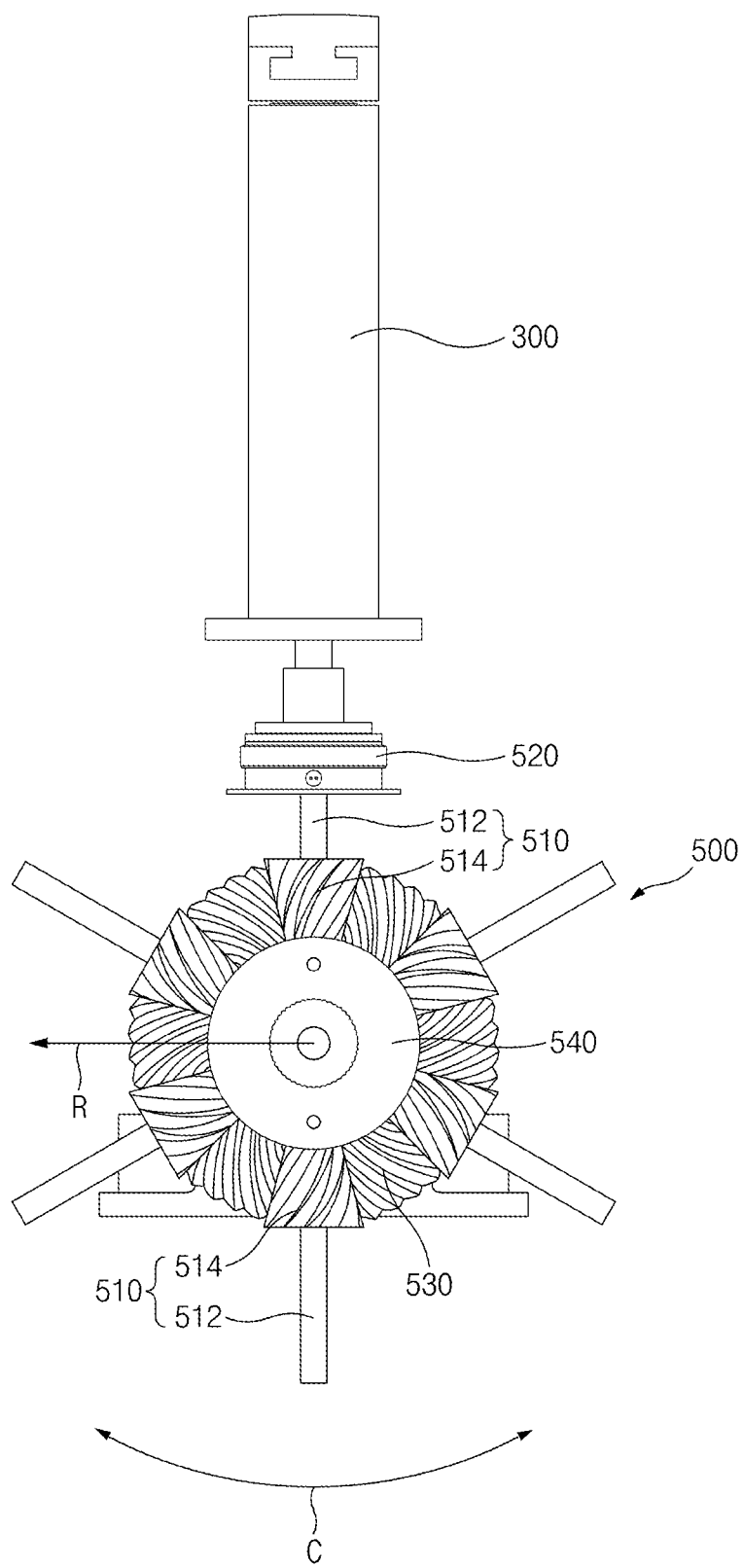
FIG. 5 is a view illustrating a first example of a power transmission structure that may be applied to the wheel structure according to the present disclosure.
Figure 6:
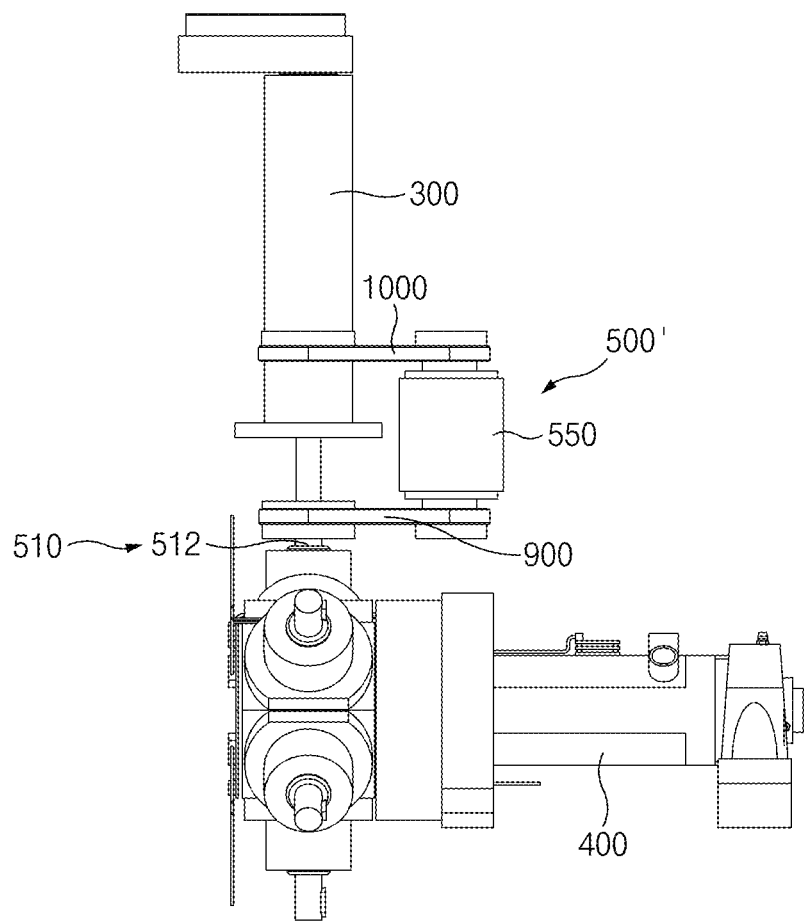
FIG. 6 is a view illustrating a second example of the power transmission structure that may be applied to the wheel structure according to the present disclosure.
Figure 7:
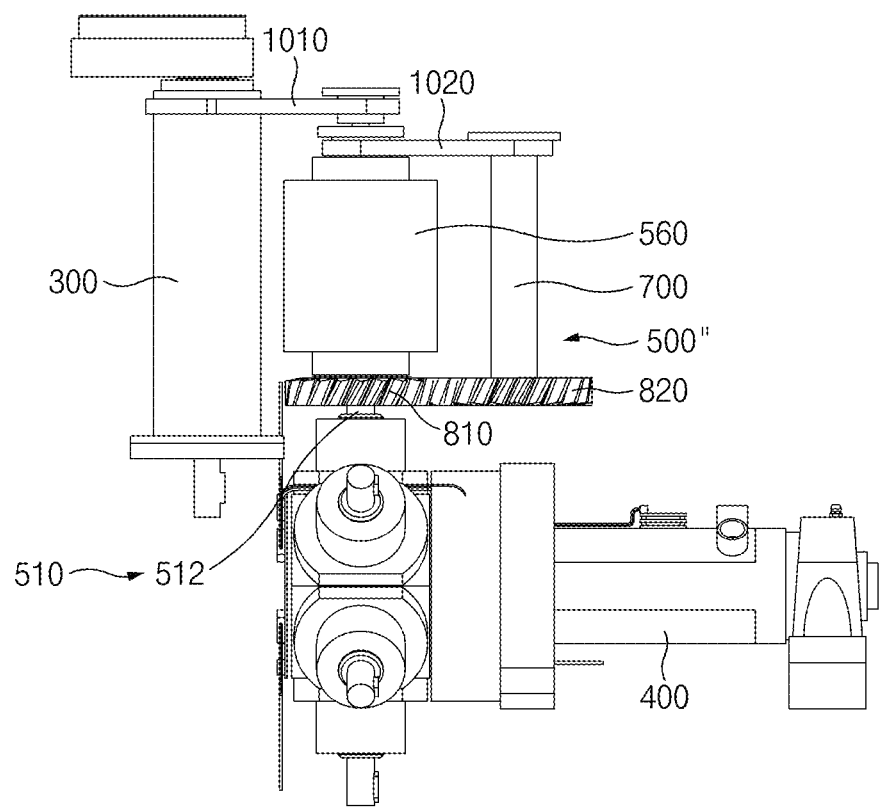
FIG. 7 is a view illustrating a third example of the power transmission structure that may be applied to the wheel structure according to the present disclosure.
Figure 8:
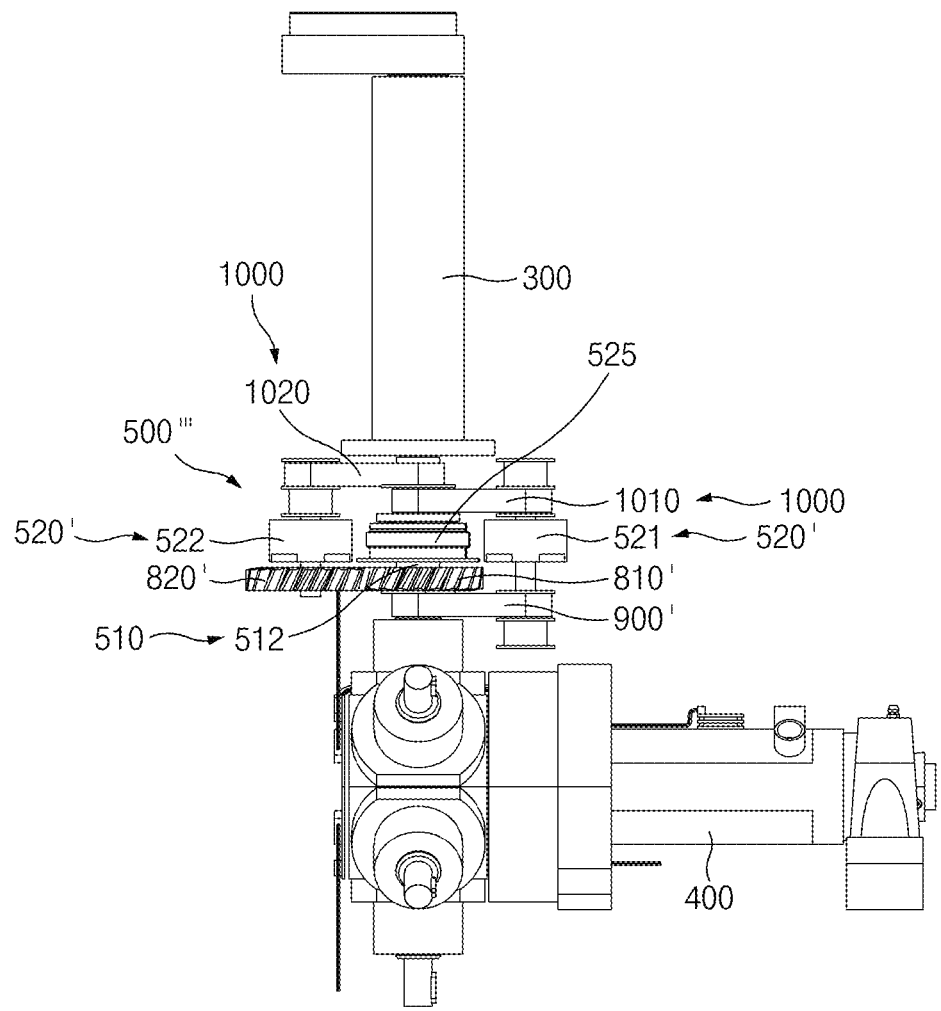
FIG. 8 is a view illustrating a fourth example of the power transmission structure that may be applied to the wheel structure according to the present disclosure.

FIG. 5 is a view illustrating a first example of a power transmission structure that may be applied to the wheel structure according to the present disclosure, and FIG. 6 is a view illustrating a second example of the power transmission structure that may be applied to the wheel structure according to the present disclosure. FIG. 7 is a view illustrating a third example of the power transmission structure that may be applied to the wheel structure according to the present disclosure, and FIG. 8 is a view illustrating a fourth example of the power transmission structure that may be applied to the wheel structure according to the present disclosure.

Referring to FIGS. 5 to 8, the wheel structure 10 and 10' according to the present disclosure may further include a power transmission unit 500, 500', 500", 500''' configured to transmit power from the spoke driving unit 400 to the plurality of variable spokes 300 and 300'.

More specifically, referring to FIG. 5, the power transmission unit 500 may include: output shafts 510 configured to rotate by receiving power from the spoke driving unit 400; and clutches 520 configured to dynamically connect the variable spokes 300 and the output shafts 510, the clutches 520 being configured to selectively transmit rotational forces of the output shafts 510 to the variable spokes 300 or cut off the transmission of the rotational forces to the variable spokes 300. Therefore, according to the present disclosure, the lengths of the variable spokes 300 may be controlled because the clutches 520 may selectively transmit the rotational forces of the output shafts 510 to the variable spokes 300 or cut off the transmission of the rotational forces to the variable spokes 300 even though the output shafts 510 are rotated by an operation of the spoke driving unit 400. Meanwhile, the configuration in which the clutch 520 dynamically connects the variable spoke 300 and the output shaft 510 means that the clutch 520 mediates the transmission of the rotational force from the output shaft 510 to the variable spoke 300, but does not necessarily mean that the clutch 520 is coupled directly to the output shaft 510 and the variable spoke 300.

More particularly, the output shaft 510 may be provided in plural, the clutch 520 may be provided in plural, the plurality of clutches 520 may respectively connect the variable spokes 300 and the output shafts 510. That is, according to the exemplary embodiment of the present disclosure, the variable spoke 300, the output shaft 510, and the clutch 520 may correspond to one another in a one-to-one manner. Therefore, according to the present disclosure, when the lengths of some of the plurality of variable spokes 300 need to be increased during a process in which the wheel structure 10 and 10' moves, the clutches 520, which are dynamically connected to the variable spokes of which the lengths need to be increased, transmit the rotational forces of the output shafts 510, which are dynamically connected to the clutches, to the variable spokes of which the lengths need to be increased. Therefore, the lengths of the variable spokes may be increased. In contrast, the clutches 520 connected to the remaining variable spokes 300 cut off the transmission of the rotational forces from the output shafts 510, which are connected to the clutches 520, to the variable spokes. Therefore, the lengths of the remaining variable spokes 300 are not changed.

Meanwhile, as illustrated in FIGS. 1 to 4, the variable spoke 300 and 300' may be divided into a plurality of regions. When the variable spoke 300 and 300' receives the rotational force from the output shaft 510 through the clutch 520, the plurality of regions may move relative to one another, such that the length of the variable spoke 300 and 300' may be adjusted.

For example, as illustrated in FIGS. 1 to 4, the variable spoke 300 and 300' may include: a first spoke region 310 and 310' having one side fixed relative to the clutch 520; and a second spoke region 320 and 320' inserted and coupled into the first spoke region 310 and 310' and configured to be movable outward in the radial direction R by receiving the rotational force from the output shaft 510. That is, when the variable spoke 300 and 300' receives the rotational force from the output shaft 510, the second spoke region 320 and 320' may move outward in the radial direction R in the state in which the first spoke region 310 and 310' is fixed relative to the output shaft 510 and the clutch 520. Therefore, the length of the variable spoke 300 and 300' may be increased. Meanwhile, FIGS. 3 and 4 illustrate that the variable spoke 300' includes a third spoke region 330 in addition to the first spoke region 310' and the second spoke region 320'. The third spoke region 330 is inserted and coupled into the second spoke region 320' and configured to be movable outward in the radial direction R by receiving the rotational force from the output shaft 510. In the case in which the variable spoke 300' further includes the third spoke region 330, the outer region of the wheel 100' may be fixedly coupled to an outer end of the third spoke region 330 based on the radial direction R. As illustrated in FIGS. 1 and 2, in the case in which the variable spoke 300 does not include the third spoke region, the outer region of the wheel 100 may be fixedly coupled to an outer end of the second spoke region 320 based on the radial direction R.

For example, the variable spoke 300' may include a telescopic ball screw, and the first to third spoke regions 310', 320', and 330 or the first and second spoke regions 310' and 320' may be fixedly coupled to a plurality of screw members that constitute the telescopic ball screw and are movable relative to one another. Therefore, when the telescopic ball screw receives the rotational force from the output shaft 510, the plurality of screw members moves in the radial direction R while rotating, such that the second spoke region 320' or the second and third spoke regions 320' and 330 may move outward in the radial direction R. The description of the structure and the operational principle of the telescopic ball screw may be replaced with the contents publicly known in the related art. Because the telescopic ball screw may smoothly operate not only in a direction in which a length thereof increases but also in a direction in which the length thereof decreases, there is an advantage in minimizing a force required to restore the variable spoke 300', which has the increased length, to an original state, as described below.

Meanwhile, as illustrated in FIG. 5, the output shaft 510 may be divided into a plurality of regions. More specifically, the output shaft 510 may include: a shaft body 512 extending in the radial direction R and having one side connected to the clutch 520; and a shaft gear 514 fixedly coupled to the shaft body 512 and having a serrated region provided at an outer side thereof.

Meanwhile, as illustrated in FIG. 5, the power transmission unit 500 may include: an input shaft 540 connected to the spoke driving unit 400 and configured to be rotatable by receiving power from the spoke driving unit 400; and a ring gear 530 fixedly coupled to an outer periphery of the input shaft 540. In this case, the ring gear 530 may have a serrated region that engages with the serrated regions formed on the shaft gears 514. Because the ring gear 530 is fixedly coupled to the input shaft 540, the ring gear 530 may rotate together with the input shaft 540 in conjunction with the rotation of the input shaft 540.

Therefore, according to the present disclosure, when the input shaft 540 rotates by receiving power from the spoke driving unit 400, the ring gear 530 fixedly coupled to the input shaft 540 also rotates. Therefore, the output shaft 510, which engages with the ring gear 530 through the serrated regions, rotates. More particularly, the output shaft 510 may rotate in place about a central axis thereof without revolving around the input shaft 540. For example, a direction in which the shaft body 512 of the output shaft 510 extends may be perpendicular to a direction in which the input shaft 540 extends. For example, the input shaft 540, the output shafts 510, and the ring gear 530 may constitute a multi-axis gearbox in which a single input shaft and a plurality of output shafts correspond to one another.

Meanwhile, as illustrated in FIGS. 1 and 2, according to one example of the present disclosure, the outer region of the wheel 100 may include: a plurality of leg regions 110 respectively fixedly coupled to the outer ends of the plurality of variable spokes 300 based on the radial direction R; and a plurality of support regions 120 each provided between the two leg regions 110 adjacent to each other in the circumferential direction C. For example, as illustrated in the drawings, when six variable spokes 300 are provided, six leg regions 110 and six support regions 120 may also be provided.

According to one example of the present disclosure, because the leg region 110 is connected to the variable spoke 300, the leg region 110 may move outward in the radial direction R when the power from the spoke driving unit 400 is transmitted to the variable spoke 300 through the clutch 520. In contrast, the support region 120 may be fixed regardless of the movement of the leg region 110. That is, according to one example of the present disclosure, a distance between the support region 120 and the central shaft A of the wheel 100 may always be constant. To this end, according to one example of the present disclosure, the wheel 100 may further include connection regions 130 extending outward in the radial direction R from the central shaft A and configured to connect the central shaft A and the support regions 120. For example, the connection region 130 may be understood as a stationary spoke with a fixed length, unlike the variable spoke 300 with a variable length.

Referring to FIGS. 1 and 2, according to one example of the present disclosure, two opposite ends of the leg region 110 based on the circumferential direction C may be in contact with the support regions 120 adjacent to the leg region 110 in a state in which power from the spoke driving unit 400 is not transmitted to the variable spoke 300 through the clutch 520, i.e., an initial state in which the length of the variable spoke 300 is not increased. In this case, the leg regions 110 and the support regions 120 may stably support one another when the wheel structure 10 moves on the ground surface. Therefore, it is possible to ensure the stable traveling performance of the wheel structure 10.

In contrast, as illustrated in FIGS. 3 and 4, according to another example of the present disclosure, the wheel 100' includes the plurality of leg regions 110' respectively fixedly coupled to the outer ends of the plurality of variable spokes 300' based on the radial direction R. However, the wheel 100' may not include the support region 120 and the connection region 130. In this case, according to another example of the present disclosure, two opposite ends, based on the circumferential direction C, of any one of the plurality of leg regions 110' of the wheel 100' may be in contact with adjacent leg regions 110' adjacent to one leg region 110'. In this case, the leg regions 110' may support one another when the wheel structure 10' moves on the ground surface. Therefore, it is possible to ensure the stable traveling performance of the wheel structure 10'.

Meanwhile, the wheel structure 10 and 10' according to the present disclosure may further include a configuration that restores the length of the variable spoke 300 and 300', of which the length is increased by power transmitted from the spoke driving unit 400, to the original state. More specifically, the wheel structure 10 and 10' may further include restoring members 600 each configured to apply a force to the variable spoke 300 and 300' in a direction in which the length of the variable spoke 300 and 300' in the radial direction R decreases in a state in which the length of the variable spoke 300 and 300' in the radial direction R has increased. More specifically, an inner end of the restoring member 600 based on the radial direction R may be fixedly coupled to the central shaft A, and an outer end of the restoring member 600 based on the radial direction R may be fixedly coupled to the outer region of the wheel 100 and 100', i.e., the leg region 110 and 110'.

For example, as illustrated in FIGS. 1 and 2, the restoring member 600 may be a gas spring. The gas spring is configured to apply a force in one direction by using a pressure of a gas injected into the gas spring. The gas spring may apply an almost constant amount of force regardless of a change in length of the gas spring. In particular, in the case in which the variable spoke 300 includes the telescopic ball screw as described above, the telescopic ball screw may be moved, in the direction in which the length thereof decreases, by the restoring member 600, e.g., the pressure of the gas spring immediately after the clutch 520 cuts off the transmission of power to the variable spoke 300 because of the nature of the telescopic ball screw having high efficiency in operating not only in the direction in which the length thereof increases but also in the direction in which the length thereof decreases.

As illustrated in FIGS. 1 and 2, the restoring member 600 may be provided in plural, and the plurality of restoring members 600 is equal in number to the variable spokes 300. The restoring member 600 may be provided in parallel with the variable spoke 300 so that the restoring member 600 may apply the force to the variable spoke 300. This is to allow the restoring member 600 to apply the force in a direction parallel to the direction in which the length of the variable spoke 300 decreases. In addition, the restoring member 600 may be spaced apart from the variable spoke 300 in a width direction W of the wheel structure 10.

Meanwhile, unlike the configuration illustrated in FIGS. 1 and 2, the restoring member 600 may be a band member having elasticity. The band member differs from the gas spring in that as the amount of change in length of the variable spoke 300 and 300' increases, an elastic force of the band member increases, and thus the magnitude of the force applied to the variable spoke 300 and 300' also increases. For example, the band member may be a rubber band.

The band member, which is used as the restoring member 600, may also be provided in parallel with the variable spoke 300 and 300' and spaced apart from the variable spoke 300 and 300' in the width direction W of the wheel structure 10 and 10'. However, the band member, which is used as the restoring member 600, may extend in the radial direction R and surround a part of the outer periphery of the variable spoke 300 and 300'. Alternatively, the band member may surround the outer periphery of the variable spoke 300 and 300' one or more times.

Meanwhile, the wheel structure 10 and 10' according to the present disclosure may further include brakes 525 (see FIG. 8) each configured to brake the motion of the variable spoke 300 and 300' in the direction in which the length of the variable spoke 300 and 300' decreases. When the transmission of power from the spoke driving unit 400 to the variable spoke 300 and 300' is cut off in the state in which the length of the variable spoke 300 and 300' has increased as described above, the length of the variable spoke 300 and 300' in the radial direction R is decreased by the restoring member 600. In this case, the brake 525 may be configured to temporarily restrict the contraction of the variable spoke 300 and 300'. As described below, this is to maximize the traveling performance of the wheel structure 10 and 10' by optimizing the change in length of the variable spoke 300 and 300' during the process in which the wheel structure 10 and 10' moves.

The clutch 520 and the brake 525 may be electronic components. Therefore, the power transmission implemented by the clutch 520 and the braking operation implemented by the brake 525 may be electronically controlled.

Hereinafter, various examples of the power transmission structure, which may be applied to the wheel structure 10 and 10' according to the present disclosure, will be described with reference to FIGS. 6 to 8.

As described above, as illustrated in FIG. 5, according to a first example of the power transmission structure, the power transmission unit 500 may include the output shafts 510 and the clutches 520. The features of the output shaft 510 and the clutch 520, which have been described above with reference to FIG. 5, are also equally applied to the configurations illustrated in FIGS. 6 to 8. However, the following configurations differ from the above-mentioned configuration of the power transmission structure according to the first example of the present disclosure described with reference to FIG. 5 in terms of the detailed components for transmitting the rotational force from the output shaft 510 to the variable spoke 300 and 300'.

Referring to FIG. 6, according to a second example of the power transmission structure of the wheel structure 10 and 10' according to the present disclosure, the power transmission unit 500' may further include clutch-brake units 550 each including the clutch 520 (see FIG. 5) and the brake 525 (see FIG. 8) configured to brake the motion of the variable spoke 300 and 300' in the direction in which the length of the variable spoke 300 and 300' decreases.

In this case, the wheel structure 10 and 10' may further include: front end pulley members 900 each configured to connect the shaft body 512 of the output shaft 510 and the clutch-brake unit 550 and transmit a rotational force of the output shaft 510 to the clutch-brake unit 550; and rear end pulley members 1000 each configured to connect the variable spoke 300 and 300' and the clutch-brake unit 550 and transmit a rotational force of the clutch-brake unit 550 to the variable spoke 300 and 300'.

According to the second example of the power transmission structure of the wheel structure 10 and 10' according to the present disclosure, when the length of the variable spoke 300 and 300' needs to be increased, the rotational force of the output shaft 510 may be transmitted to the variable spoke 300 and 300' through the front end pulley member 900, the clutch in the clutch-brake unit 550, and the rear end pulley member 1000. Thereafter, when the clutch cuts off the transmission of power to the variable spoke 300 and 300', the length of the variable spoke 300 and 300' is restored to the original length by the restoring member 600. In this case, when the brake in the clutch-brake unit 550 operates, the length of the variable spoke 300 and 300' may be maintained without being decreased. A process of controlling the length of the variable spoke 300 and 300' by using the brake will be described below when a method of controlling the wheel structure according to the present disclosure is described.

Meanwhile, referring to FIG. 7, according to a third example of the power transmission structure of the wheel structure 10 and 10' according to the present disclosure, the power transmission unit 500" may include double clutch-brake units 560 each including the clutch 520 (see FIG. 5) and the brake 525 (see FIG. 8) configured to brake the motion of the variable spoke 300 and 300' in the direction in which the length of the variable spoke 300 and 300' decreases. As described below, the double clutch-brake unit 560 differs from the clutch-brake unit 550 in that the double clutch-brake unit 560 includes a plurality of clutches.

In this case, the wheel structure 10 and 10' may further include: first gear members 810 each fixedly coupled to the shaft body 512 of the output shaft 510 and having a serrated region formed on an outer surface thereof; second gear members 820 each having a serrated region formed on an outer surface thereof and configured such that the serrated region engages with the serrated region of the first gear member 810; connection shafts 700 each fixedly coupled to the second gear member 820 and extending in one direction; first rear end pulley members 1010 each configured to connect the double clutch-brake unit 560 and the variable spoke 300 and 300' and transmit a rotational force of the double clutch-brake unit 560 to the variable spoke 300 and 300'; and second rear end pulley members 1020 each configured to connect the connection shaft 700 and the double clutch-brake unit 560 and transmit a rotational force of the connection shaft 700 to the double clutch-brake unit 560.

In this case, the clutches in the double clutch-brake unit 560 may include: a first clutch configured to connect the output shaft 510 and the first rear end pulley member 1010 and selectively transmit a rotational force of the output shaft 510 to the first rear end pulley member 1010 or cut off the transmission of the rotational force to the first rear end pulley member 1010; and a second clutch configured to connect the second rear end pulley member 1020 and the first rear end pulley member 1010 and selectively transmit a rotational force of the second rear end pulley member 1020 to the first rear end pulley member 1010 or cut off the transmission of the rotational force to the first rear end pulley member 1010. More particularly, the first rear end pulley member 1010 and the second rear end pulley member 1020 may be indirectly connected to each other through a shaft coupled to the second clutch.

According to the third example of the power transmission structure of the wheel structure 10 according to the present disclosure, the rotational force of the output shaft 510 may be transmitted to the variable spoke 300 and 300' through a plurality of power transmission routes.

For example, in a case in which the length of the variable spoke 300 and 300' needs to be increased, the rotational force of the output shaft 510 is transmitted to the variable spoke 300 and 300' through the first clutch and the first rear end pulley member 1010. In contrast, the second clutch cuts off the power transmission.

Thereafter, in a case in which the length of the variable spoke 300 and 300' needs to be decreased, the rotational force of the output shaft 510 is transmitted to the variable spoke 300 and 300' through the first gear member 810, the second gear member 820, the connection shaft 700, the second rear end pulley member 1020, the second clutch, and the first rear end pulley member 1010. That is, because the first gear member 810 and the second gear member 820 engage with each other, a rotation direction of the output shaft 510 and a rotation direction of the second gear member 820 are opposite to each other. Therefore, a motion direction of the variable spoke 300 and 300' when the rotational force of the output shaft 510 is transmitted to the variable spoke 300 and 300' through the first clutch is opposite to a motion direction of the variable spoke 300 and 300' when the rotational force is transmitted to the variable spoke 300 and 300' through the second clutch. In particular, as illustrated in FIG. 7, according to the third example of the power transmission structure, there may be an advantage in that it is possible to more actively decrease the length of the variable spoke 300 and 300' in comparison with a case in which a speed at which the restoring member 600 (see FIGS. 1 and 2) decreases the length of the variable spoke 300 and 300' is not sufficient.

Meanwhile, referring to FIG. 8, according to a fourth example of the power transmission structure of the wheel structure 10 according to the present disclosure, the power transmission unit 500''' may further include the brakes 525 each configured to brake the motion of the variable spoke 300 and 300' in the direction in which the length of the variable spoke 300 and 300' decreases.

In addition, the wheel structure 10 and 10' may include: the first gear member 810' fixedly coupled to the shaft body 512 of the output shaft 510, provided between the brake 525 and the shaft body 512 of the output shaft 510, and having the serrated region formed on the outer surface thereof; the second gear member 820' having the serrated region formed on the outer surface thereof and configured such that the serrated region engages with the serrated region of the first gear member 810'; the front end pulley member 900' connected to the first gear member 810' and configured to receive the rotational force of the first gear member 810'; and the rear end pulley members 1000 configured to connect the clutches 520' and the variable spoke 300 and 300'. More particularly, the front end pulley member 900' may be indirectly connected to the first gear member 810' through a separate rotary shaft, and the rear end pulley members 1000 may also be respectively and indirectly connected to the clutches 520' and the variable spoke 300 and 300' through separate rotary shafts.

Referring to FIG. 8, the clutches 520' may include a first clutch 521 connected to the front end pulley member 900', and a second clutch 522 connected to the second gear member 820'. In this case, the rear end pulley members 1000 may include the first rear end pulley member 1010 configured to connect the first clutch 521 and the variable spoke 300 and 300', and the second rear end pulley member 1020 configured to connect the second clutch 522 and the variable spoke 300 and 300'.

Similar to the third example of the power transmission structure, according to the fourth example of the power transmission structure of the wheel structure 10 and 10' according to the present disclosure, the rotational force of the output shaft 510 may be transmitted to the variable spoke 300 and 300' through the plurality of power transmission routes.

For example, in a case in which the length of the variable spoke 300 and 300' needs to be increased, the rotational force of the output shaft 510 is transmitted to the variable spoke 300 and 300' through the front end pulley member 900', the first clutch 521, and the first rear end pulley member 1010. In contrast, the second clutch 522 cuts off the power transmission.

Thereafter, in a case in which the length of the variable spoke 300 and 300' needs to be decreased, the rotational force of the output shaft 510 is transmitted to the variable spoke 300 and 300' through the first gear member 810', the second gear member 820', the second clutch 522, and the second rear end pulley member 1020. That is, a rotation direction of the first output shaft 510 and a rotation direction of the front end pulley member 900' are identical to each other, whereas a rotation direction of the output shaft 510 and a rotation direction of the second gear member 820' are opposite to each other because the first gear member 810' and the second gear member 820' engage with each other. Therefore, a motion direction of the variable spoke 300 and 300' when the power is transmitted to the variable spoke 300 and 300' through the first clutch 521 is opposite to a motion direction of the variable spoke 300 and 300' when the power is transmitted to the variable spoke 300 and 300' through the second clutch 522. Similar to the third example of the power transmission structure, even in the fourth example of the power transmission structure, there may be an advantage in that it is possible to more actively decrease the length of the variable spoke 300 and 300' in comparison with a case in which a speed at which the restoring member 600 (see FIGS. 1 and 2) decreases the length of the variable spoke 300 and 300' is not sufficient.

Hereinafter, the method of controlling the wheel structure according to the present disclosure will be described with reference to the above-mentioned description.

Figure 9:
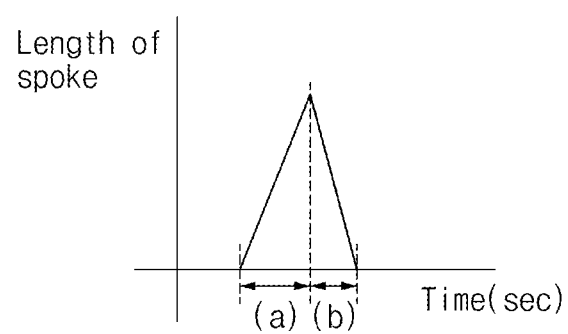
FIG. 9 is a graph illustrating a change in length of a variable spoke over time when the variable spoke is controlled by a method of controlling the wheel structure according to the first example of the present disclosure.
Figure 10:
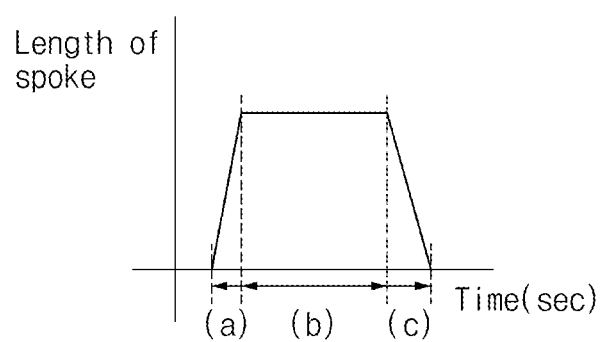
FIG. 10 is a graph illustrating a change in length of the variable spoke over time when the variable spoke is controlled by a method of controlling the wheel structure according to the second example of the present disclosure.
Figure 11:
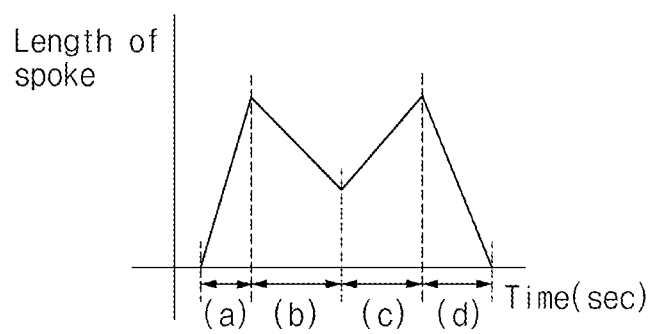
FIG. 11 is a graph illustrating a change in length of the variable spoke over time when the variable spoke is controlled by a method of controlling the wheel structure according to the third example of the present disclosure.

FIG. 9 is a graph illustrating a change in length of a variable spoke over time when the variable spoke is controlled by the method of controlling the wheel structure according to the first example of the present disclosure, and FIG. 10 is a graph illustrating a change in length of the variable spoke over time when the variable spoke is controlled by the method of controlling the wheel structure according to the second example of the present disclosure. FIG. 11 is a graph illustrating a change in length of the variable spoke over time when the variable spoke is controlled by the method of controlling the wheel structure according to the third example of the present disclosure.

The method of controlling the wheel structure 10 and 10' according to the present disclosure may be applied to a case in which the wheel structure 10 and 10' moves in a region (e.g., a pit) recessed downward and disposed at a front side on the ground surface on which the wheel structure 10 and 10' moves. In particular, the method of controlling the wheel structure 10 and 10' according to the present disclosure is advantageous in allowing the wheel structure 10 and 10' to pass over the downwardly recessed ground surface while minimizing a change in height of the central shaft A of the wheel structure 10 and 10'. In the present specification, a front region of the wheel structure 10 and 10' may be defined as a region positioned forward of a region in which the wheel structure 10 and 10' is in contact with the ground surface during a process in which the wheel structure 10 and 10' moves on the ground surface. A rear region of the wheel structure 10 and 10' may be defined as a region positioned rearward of the region in which the wheel structure 10 and 10' is in contact with the ground surface during a process in which the wheel structure 10 and 10' moves on the ground surface.

More specifically, the method of controlling the wheel structure 10 and 10' may include a front length increasing step of increasing the length of the variable spoke 300 and 300' provided in the front region of the wheel structure 10 and 10' when a downwardly recessed ground surface is present at a front side based on a traveling direction of the wheel structure 10 and 10'. The front length increasing step may serve to increase ride quality of a mobility having the wheel structure 10 and 10' by minimizing the downward movement of the wheel structure 10 and 10' by increasing the length of the variable spoke 300 and 300', which is to come into contact with the recessed ground surface, when the downwardly recessed ground surface is disposed forward of the wheel structure 10 and 10'.

The front length increasing step may be performed by transmitting the power of the spoke driving unit 400 to the variable spoke 300 and 300' through the clutch. The front length increasing step may be performed by transmitting the rotational force of the output shaft 510 to the variable spoke 300 and 300' through the clutch 520 (see FIG. 5) of the first example of the power transmission structure, the clutch in the clutch-brake unit 550 (see FIG. 6) of the second example of the power transmission structure, the first clutch in the double clutch-brake unit 560 (see FIG. 7) of the third example of the power transmission structure, and the first clutch 521 (see FIG. 8) of the fourth example of the power transmission structure. The front length increasing step may correspond to the increase in length of the variable spoke 300 and 300' over time in section (a) in FIG. 9, section (a) in FIG. 10, and section (a) in FIG. 11.

In addition, the method of controlling the wheel structure 10 and 10' may further include a rear length decreasing step of decreasing the length of the variable spoke 300 and 300' in the rear region of the wheel structure 10 and 10' in the state in which the variable spoke 300 and 300' has the length increased in the front length increasing step. The rear length decreasing step is performed after the front length increasing step. The rear length decreasing step may serve to prepare the movement on the flat ground surface by allowing the variable spoke 300 and 300', which has the increased length and supports the downwardly recessed ground surface, to have the length in the original state again.

The rear length decreasing step may be performed as the length of the variable spoke 300 and 300' is decreased by the restoring member 600 in the state in which the clutch cuts off the transmission of power of the spoke driving unit 400. The rear length decreasing step may be performed by cutting off the transmission of the rotational force of the output shaft 510 to the variable spoke 300 and 300' through the clutch 520 (see FIG. 5) of the first example of the power transmission structure, the clutch in the clutch-brake unit 550 (see FIG. 6) of the second example of the power transmission structure, the first clutch in the double clutch-brake unit 560 (see FIG. 7) of the third example of the power transmission structure, and the first clutch 521 (see FIG. 8) of the fourth example of the power transmission structure. However, in the case of the third and fourth examples of the power transmission structure, the rotational force of the output shaft 510 may be transmitted to the variable spoke 300 and 300' through the second clutch 522 (see FIG. 8) and the second clutch in the double clutch-brake unit 560 (see FIG. 7) in the rear length decreasing step. Therefore, the rotational force transmitted to the variable spoke 300 and 300' through the second clutch may actively decrease the length of the variable spoke 300 and 300'. This is because the direction of the rotational force transmitted to the variable spoke 300 and 300' through the first clutch is opposite to the direction of the rotational force transmitted to the variable spoke 300 and 300' through the second clutch. The description of the reason why the directions of the two rotational forces are opposite to each other may be replaced with the description of the wheel structure 10 according to the present disclosure described with reference to FIGS. 7 and 8. The rear length decreasing step may correspond to the decrease in length of the variable spoke 300 and 300' over time in section (b) in FIG. 9, section (c) in FIG. 10, and section (d) in FIG. 11.

Meanwhile, according to the first example of the present disclosure, the rear length decreasing step of the method of controlling the wheel structure 10 and 10' may be performed immediately after the front length increasing step is ended. In this case, as illustrated in FIG. 9, the length of the variable spoke 300 and 300' may vary over time. More particularly, the leg region 110 and 110' coupled to the variable spoke 300 and 300' with the increased length may be in contact with the ground surface at a point in time at which the front length increasing step is ended, i.e., at a point in time at which the rear length decreasing step is started. For example, in the case in which the power transmission structure of the wheel structure 10 and 10' is configured as illustrated in FIG. 5, the wheel structure 10 and 10' may be controlled such that the rear length decreasing step is performed immediately after the front length increasing step is ended.

In contrast, according to the second example of the present disclosure, the method of controlling the wheel structure 10 and 10' may further include a length maintaining step of maintaining the length of the variable spoke 300 and 300' in the state in which the variable spoke 300 and 300' has the length increased in the front length increasing step. The length maintaining step is performed between the front length increasing step and the rear length decreasing step. The length maintaining step may be performed as the brake operates in the state in which the transmission of the power of the spoke driving unit 400 to the variable spoke 300 and 300' is cut off. The length maintaining step may correspond to the situation in which the length of the variable spoke 300 and 300' is constantly maintained over time in section (b) in FIG. 10. For example, in the case in which the power transmission structure of the wheel structure 10 and 10' is configured as illustrated in FIGS. 6 to 8, the wheel structure 10 and 10' may be controlled by the method including the length maintaining step.

In the case in which the length maintaining step is additionally performed as described above, the front length increasing step may be ended before the leg region 110 and 110' coupled to the variable spoke 300 and 300' with the increased length reaches the ground surface, and the rear length decreasing step may be started after the leg region 110 and 110' coupled to the variable spoke 300 and 300' with the increased length moves away from the ground surface. This is to implement the stable movement of the wheel structure 10 and 10' in the recessed ground surface by allowing the leg region 110 and 110' coupled to the variable spoke 300 and 300' to come into contact with the downwardly recessed ground surface in the state in which the length of the variable spoke 300 and 300' is constant after the length of the variable spoke 300 and 300' is completely increased.

Meanwhile, according to the third example of the present disclosure, the method of controlling the wheel structure 10 and 10' may further include a front length decreasing step of decreasing the length of the variable spoke 300 and 300' in the front region of the wheel structure 10 and 10' in the state in which the variable spoke 300 and 300' has the length increased in the front length increasing step. The front length decreasing step is performed after the front length increasing step. More specifically, according to the third example of the present disclosure, the front length increasing step may be performed until the leg region 110 and 110' coupled to the variable spoke 300 and 300' comes into contact with the ground surface, and the front length decreasing step may be performed until the leg region 110 and 110' moves to the rear region of the wheel structure 10 and 10' from a point in time at which the leg region 110 and 110' coupled to the variable spoke 300 and 300' begins to come into contact with the ground surface. This is to minimize a change in height of the central shaft A of the wheel structure 10 and 10' when the wheel structure 10 and 10' moves on the downwardly recessed ground surface. The front length decreasing step may correspond to the decrease in length of the variable spoke 300 over time in section (b) in FIG. 11. For example, in the case in which the power transmission structure of the wheel structure 10 and 10' is configured as illustrated in FIGS. 7 and 8, the wheel structure 10 and 10' may be controlled by the method including the front length decreasing step. More specifically, the length decreasing step may be performed by transmitting the power to the variable spoke 300 and 300' through the second clutch in the double clutch-brake unit 560 in FIG. 7 and the second clutch 522 in FIG. 8.

According to the third example of the present disclosure, the method of controlling the wheel structure 10 and 10' may further include a rear length increasing step of increasing the length of the variable spoke 300 and 300' in the rear region of the wheel structure 10 and 10' in the state in which the variable spoke 300 and 300' has the length decreased in the front length decreasing step. The rear length increasing step is performed after the front length decreasing step. More specifically, according to the third example of the present disclosure, the rear length increasing step may be performed until the leg region 110 and 110' moves away from the ground surface from a point in time at which the leg region 110 and 110' coupled to the variable spoke 300 and 300' is moved to the rear region of the wheel structure 10 and 10', and the rear length decreasing step may be performed from a point in time at which the leg region 110 and 110' coupled to the variable spoke 300 and 300' moves away from the ground surface. This is to minimize a change in height of the central shaft A of the wheel structure 10 and 10' when the wheel structure 10 and 10' moves on the downwardly recessed ground surface. The rear length increasing step may correspond to the increase in length of the variable spoke 300 and 300' over time in section (c) in FIG. 11C.

Meanwhile, FIG. 11 illustrates that the front length decreasing step is performed immediately after the front length increasing step is ended, and the rear length decreasing step is performed immediately after the rear length increasing step is ended. However, alternatively, a length maintaining step of maintaining the length of the variable spoke 300 and 300' may be performed between the front length increasing step and the front length decreasing step and between the rear length increasing step and the rear length decreasing step.

Meanwhile, as illustrated, in the case in which the power transmission unit 500″ and 500‴ includes the first and second clutches like the third and fourth examples of the power transmission structure, the restoring member 600 may not be provided because the second clutch transmits the power to the variable spoke 300 and 300′ in the direction in which the length of the variable spoke 300 and 300′ decreases.

Mobility

A mobility according to the present disclosure may be a mobility that travels at low speed. For example, the mobility according to the present disclosure may be an electric wheelchair.

The mobility according to the present disclosure may include the wheel structure 10 and 10′, and a frame (not illustrated) to which the wheel structure is coupled.

The wheel structure 10 and 10′ may include: the wheel 100 and 100′ including a portion provided in the outer region of the wheel structure 10 and 10′ and extending in the circumferential direction C; the wheel driving unit 200 configured to provide power for rotating the wheel 100 and 100′ about the central shaft A; the variable spokes 300 and 300′ configured to connect the wheel 100 and 100′ and the central shaft A and each having the length that varies in the radial direction R of the wheel 100 and 100′; the spoke driving unit 400 configured to provide power for changing the lengths of the variable spokes 300 and 300′ in the radial direction R; and the power transmission unit 500, 500′, 500″, and 500‴ configured to transmit power from the spoke driving unit 400 to the variable spoke 300 and 300′.

In addition, the variable spoke 300 and 300′ may be provided in plural, and the plurality of variable spokes 300 and 300′ may be spaced apart from one another in the circumferential direction C. The power transmission unit 500, 500′, 500″, and 500‴ may include: output shafts 510 configured to rotate by receiving power from the spoke driving unit 400; and clutches 520 configured to connect the variable spokes 300 and 300′ and the output shafts 510, the clutches 520 being configured to selectively transmit rotational forces of the output shafts 510 to the plurality of variable spokes 300 and 300′ or cut off the transmission of the rotational forces to the plurality of variable spokes 300 and 300′. Meanwhile, the description of the wheel structure 10 and 10′ according to the present disclosure described with reference to the drawings may also be equally applied to the mobility according to the present disclosure.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A wheel structure comprising:
   a wheel comprising an outer portion that extends in a circumferential direction;
   a wheel driver configured to provide power for rotating the wheel about a central shaft;
   a plurality of variable spokes connecting the wheel to the central shaft and having a length configured to vary in a radial direction of the wheel;
   a spoke driver configured to provide power for changing the length of the plurality of variable spokes in the radial direction; and
   a power transmitter configured to transmit power from the spoke driver to the plurality of variable spokes,
   wherein the plurality of variable spokes are spaced apart from one another in the circumferential direction, and
   wherein the power transmitter comprises:
      an output shaft configured to rotate based on power from the spoke driver, and
      a clutch configured to connect the plurality of variable spokes to the output shaft and selectively transmit a rotational force of the output shaft to the plurality of variable spokes or restrict transmission of the rotational force to the plurality of variable spokes.

2. The wheel structure of claim 1, wherein the output shaft is provided in plural, the clutch is provided in plurality, and
   wherein the plurality of clutches respectively connects the plurality of variable spokes to the plurality of output shafts.

3. The wheel structure of claim 2, wherein each of the plurality of variable spokes comprises:
   a first spoke portion having one side fixed relative to the clutch; and
   a second spoke portion coupled to the first spoke portion and configured to move in the radial direction based on the rotational force from the output shaft.

4. The wheel structure of claim 2, wherein the output shaft comprises:
   a shaft body extending in the radial direction and having one side connected to the clutch; and
   a shaft gear fixed to the shaft body.

5. The wheel structure of claim 4, wherein the power transmitter further comprises a ring gear configured to engage the shaft gear.

6. The wheel structure of claim 5, wherein the power transmitter further comprises an input shaft connected to the spoke driver and configured to be rotated based on power from the spoke driver, and
   wherein the ring gear is fixed to an outer periphery of the input shaft.

7. The wheel structure of claim 2, wherein the wheel comprises:
   a plurality of leg portions fixed to outer ends of the plurality of variable spokes; and
   a plurality of support portions each provided between two adjacent leg portions of the plurality of leg portions in the circumferential direction, and
   wherein opposite ends of each of the plurality of leg portions along the circumferential direction contact adjacent support portions of the plurality of support portions.

8. The wheel structure of claim 7, wherein the wheel further comprises a connection portion extending outward in the radial direction from the central shaft connecting the central shaft and the support portion.

9. The wheel structure of claim 2, wherein the wheel comprises a plurality of leg portions fixed to outer ends of the plurality of variable spokes, and
   wherein opposite ends of each of the plurality of leg portions along the circumferential direction contact other leg portions of the plurality of leg portions.

10. The wheel structure of claim 1, further comprising:
    a restoring member configured to apply force to each of the plurality of variable spokes to reduce a length of each of the plurality of variable spoke based on the length of each of the plurality of variable spokes increasing.

11. The wheel structure of claim 10, wherein the restoring member includes a gas spring.

12. The wheel structure of claim 10, wherein the restoring member is provided in parallel with each of the plurality of variable spokes and spaced apart from each of the plurality of variable spokes in a width direction of the wheel structure.

13. The wheel structure of claim 1, wherein the power transmitter further comprises:
a clutch-brake comprising the clutch and a brake, the brake being configured to brake each of the plurality of variable spokes based on a length of each of the plurality of variable spokes decreasing;
a front end pulley member connecting the output shaft to the clutch-brake and configured to transmit a rotational force of the output shaft to the clutch-brake; and
a rear end pulley member connecting each of the plurality of variable spokes to the clutch-brake and configured to transmit a rotational force of the clutch-brake to the variable spoke.

14. The wheel structure of claim 1, wherein the power transmitter further comprises:
a double clutch-brake comprising the clutch and a brake, the brake being configured to brake each of the plurality of variable spokes based on a length of each of the plurality of variable spokes decreasing;
a first gear member fixed to the output shaft;
a second gear member configured to engage the first gear member;
a connection shaft fixed to the second gear member;
a first rear end pulley member connecting the double clutch-brake to each of the plurality of variable spokes and configured to transmit a rotational force of the double clutch-brake to each of the plurality of variable spokes; and
a second rear end pulley member connecting the connection shaft to the double clutch-brake and configured to transmit a rotational force of the connection shaft to the double clutch-brake, and
wherein the clutch comprises:
a first clutch configured to connect the output shaft to the first rear end pulley member and selectively transmit a rotational force of the output shaft to the first rear end pulley member or restrict transmission of the rotational force to the first rear end pulley member, and
a second clutch configured to connect the second rear end pulley member to the first rear end pulley member and selectively transmit a rotational force of the second rear end pulley member to the first rear end pulley member or restrict transmission of the rotational force to the first rear end pulley member.

15. The wheel structure of claim 1, wherein the power transmitter further comprises:
a brake configured to brake the variable spoke based on a length of the variable spoke decreasing;
a first gear member fixed to the output shaft and provided between the brake and the output shaft;
a second gear member configured to engage the first gear member;
a front end pulley member connected to the first gear member and configured to receive a rotational force of the first gear member; and a rear end pulley member configured to connect the clutch to each of the plurality of variable spokes,
wherein the clutch comprises:
a first clutch connected to the front end pulley member, and
a second clutch connected to the second gear member, and
wherein the rear end pulley member comprises:
a first rear end pulley member connecting the first clutch to each of the plurality of variable spokes, and
a second rear end pulley member configured to connect the second clutch to the plurality of variable spokes.

16. A method of controlling lengths of the plurality of variable spokes according to claim 1 based on the wheel structure moving on a ground surface, the method comprising:
increasing a length of at least one first variable spoke among the plurality of variable spokes, the at least one first variable spoke being provided in a front portion of the wheel structure based on a traveling direction of the wheel structure; and
decreasing a length of at least one second variable spoke among the plurality of variable spokes based on the length of the at least one first variable spoke increasing, the at least one second variable spoke being provided in a rear portion of the wheel structure.

17. The method of claim 16, further comprising:
based on the length of at least one first variable spoke increasing and prior to decreasing the length of the at least one second variable spoke, maintaining the length of the plurality of variable spokes.

18. The method of claim 16, further comprising:
decreasing the length of the at least one first variable spoke based on the length of the at least one first variable spoke having been increased; and
increasing the length of the at least one second variable spoke based on the length of the at least one first variable spoke being decreased.

19. A mobility equipment comprising:
a wheel structure; and
a frame coupling the wheel structure,
wherein the wheel structure comprises:
a wheel comprising an outer portion that extends in a circumferential direction,
a wheel driver configured to provide power for rotating the wheel about a central shaft,
a plurality of variable spokes connecting the wheel to the central shaft and having a length configured to vary in a radial direction of the wheel,
a spoke driver configured to provide power for changing the length of the variable spokes in the radial direction, and
a power transmitter configured to transmit power from the spoke driver to the plurality of variable spokes,
wherein the plurality of variable spokes are spaced apart from one another in the circumferential direction, and
wherein the power transmitter comprises:
an output shaft configured to rotate based on power from the spoke driver, and
a clutch configured to connect the plurality of variable spokes to the output shaft and selectively transmit a rotational force of the output shaft to the plurality of variable spokes or restrict transmission of the rotational force to the plurality of variable spokes.

* * * * *